United States Patent [19]

Awano et al.

[11] Patent Number: 4,697,062
[45] Date of Patent: Sep. 29, 1987

[54] PULSE ARC WELDING MACHINE DISABLED DURING SHORT-CIRCUITS

[75] Inventors: Yoshiro Awano; Hiroshi Suzuki; Takaji Mizuno, all of Aichi; Shigeo Ueguri, Hyogo; Kenji Higashida, Aichi, all of Japan

[73] Assignees: Mitsubishi Denki K.K.; Toyota Jidosha K.K., both of Aichi, Japan

[21] Appl. No.: 863,920

[22] Filed: May 16, 1986

[30] Foreign Application Priority Data

May 16, 1985 [JP] Japan ................... 60-104527

[51] Int. Cl.$^4$ ............................. B23K 9/09
[52] U.S. Cl. ..................... 219/130.51; 219/130.21
[58] Field of Search ............. 219/130.51, 137 PS, 219/130.21

[56] References Cited

U.S. PATENT DOCUMENTS 4,438,317  3/1984  Ueguri et al. ............. 219/130.51

FOREIGN PATENT DOCUMENTS 58-68474  4/1983  Japan ....................... 219/130.51

Primary Examiner—Clifford C. Shaw
Attorney, Agent, or Firm—Sughrue, Mion, Zinn, Macpeak & Seas

[57] ABSTRACT

A pulse arc welding machine in which current pulses are periodically applied between a welding wire and a base method. A voltage is measured between the welding wire and the base metal to determine if whether an arc to a short-circuit exists therebetween. If a short-circuit exists, a new current pulse is delayed until the arc is reestablished.

7 Claims, 9 Drawing Figures

PULSE ARC WELDING MACHINE DISABLED DURING SHORT-CIRCUITS

BACKGROUND

1. Field of The Invention

This invention relates to a pulse arc welding machine in which a pulse current is caused to flow between a welding wire and a welding base metal to generate arcs therebetween to thereby perform welding.

2. Background Art

Figure 1:
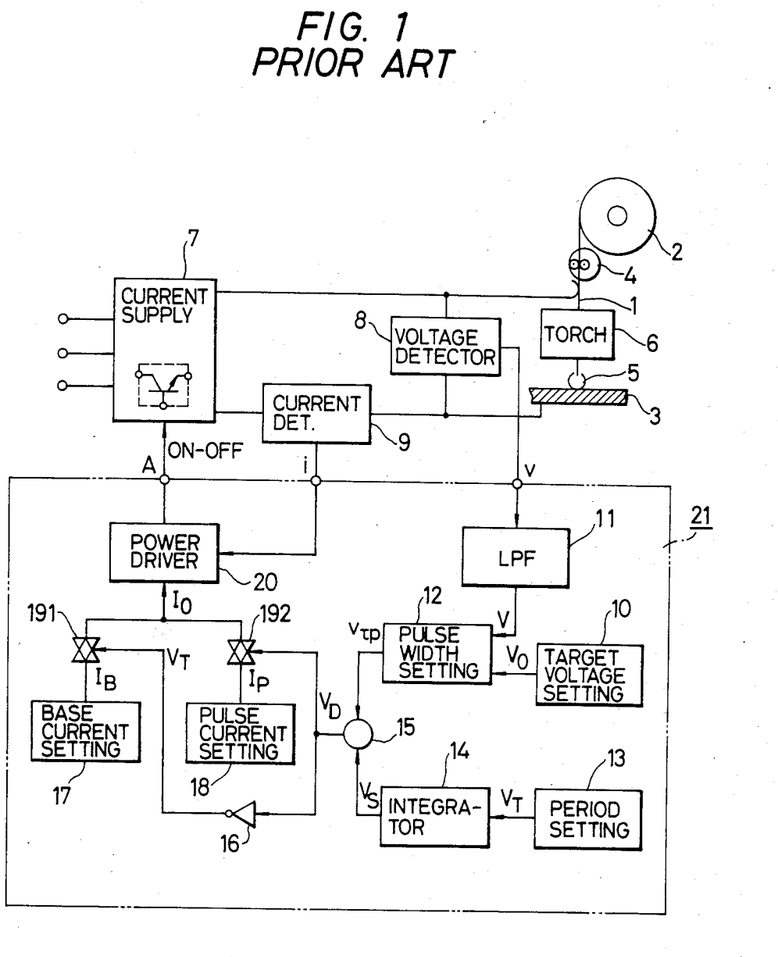
FIG. 1 is a block diagram showing the arrangement of a conventional pulse arc welding machine.

FIG. 1 is a block diagram showing the arrangement of a conventional pulse arc welding machine. In FIG. 1, a welding wire is wound from a wire reel 2 toward a welding base metal 3 by means of a wire feeding roller 4 which feeds the wire 1 towards the base metal 3. Arcs 5 are formed between the wire 1 and the base material 3 beneath a welding torch 6. The torch 6 may be a simple tube for feeding the wire 1 and may also include a nozzle for a shielding gas. A welding current supply section 7 supplies power through the wire 1 for the welding. A voltage detector 8 detects a voltage across the wire 1 and the metallic base material 3. A current detector 9 detects a welding current. A welding current waveform control unit 21 performs control of the welding.

The control unit 21 is shown in detail in FIG. 1. A voltage is set by a target voltage setting unit 10. A low-pass filter 11 filters the output of the voltage detector 8. A pulse width setting circuit 12 receives the outputs of the low-pass filter 11 and the voltage setting unit 10. A pulse period is set in a pulse period setting circuit 13 which feeds an integrating circuit 14. A comparator 15 compares the outputs of the pulse width setting circuit 12 and the integrator 14 and its output is inverted by a signal inverting element 16. A base current value is set by a base current setting section 17 and a pulse current value is set by a pulse current setting section 18. Analog switching elements 191 and 192 switch the outputs of base and pulse current setting sections 17 and 18 respectively to feed a power drive circuit 20.

The operation of the conventional pulse arc welding machine thus arranged will now be described. The wire feeding roller 4 is driven by an electric motor to feed the wire 1 from the wire reel 2 towards the base metal 3. At the same time, with the aid of the power drive circuit 20, a welding current is supplied from the welding current supply section 7 so that arcs 5 are formed between the wire 1 and the base metal 3.

In a pulse arc welding operation, in order to allow molten droplets to move in the form of fine particles from the wire to the base metal, the peak value of the pulse current should be maintained at or above a predetermined value (about 380 A in the case of a shielding gas having a compositional ratio of $Ar/CO_2 = 8/2$ and a wire diameter of 1.2 mm). Furthermore, in order to transfer approximately one fine-particle-shaped molten droplet per pulse period from the wire to the base metal, the pulse width and the pulse frequency (or period) must be determined according to the selected wire feeding rate. That is, the pulse period setting circuit 13 is operated to set a pulse period according to the selected wire feeding rate.

Figure 2:
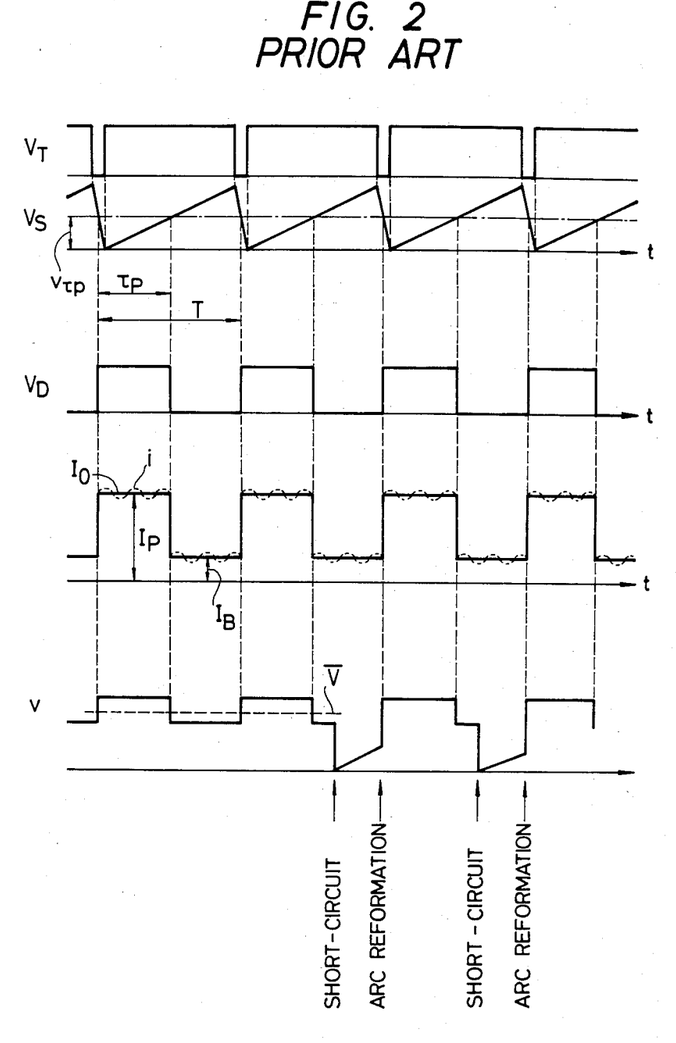
FIG. 2 is a waveform diagram for a description of the operation of the conventional pulse arc welding machine shown in FIG. 1.

Now, the operation will be described with reference to a timing chart shown in FIG. 2. The pulse period setting circuit 13 applies to the integrating circuit a pulse signal $V_T$ which transitions to a low level from a high level every pulse period. When the pulse signal $V_T$ is at the high level, it is integrated in the intergrating circuit 14. The signal, thus integrated, is applied as a signal $V_S$ to the comparator 15. When the pulse signal $V_T$ is at the low level, the low-level signal $V_T$ is integrated as a negative value so as to reset the integrated signal $V_S$ to zero, which is then applied to the comparator 15 by the integrating circuit 14. On the other hand, a voltage v detected by the voltage detector 8 is averaged into a voltage V by the low-pass filter 11. The averaged voltage V and a voltage $V_O$ set by the target voltage setting unit 10 are applied to the pulse width setting circuit 12, as a result of which the pulse width setting circuit 12 supplies a pulse width setting voltage $V_{\tau P}$ to the comparator 15.

In the comparator 15, the pulse width setting voltage $V_{\tau_p}$ and the integrated voltage $V_S$ are compared, to provide a pulse period and base period decision signal $V_D$. This decision signal $V_D$ is applied to the gate of the analog switching element 192 and the signal inverter 16. The output of the signal inverting element 16 is applied to the gate of the analog switching element 191. Accordingly, when the decision signal $V_D$ is at the high level, the analog switching element 192 is turned on, while the analog switching element 191 is turned off, so that a high-level pulse current $I_p$ is outputted by the pulse current setting section 18. On the other hand, when the decision signal $V_D$ is at the low level, the analog switching element 192 is turned off, so that a low-level base current $I_B$ is provided by the base current setting section 17. The pulse current $I_p$ and the base current $I_B$ are combined into a target current $I_O$ which is applied to the power element drive circuit 20. That is, both the high-level pulse current $I_p$ and the low-level base current $I_B$ of the target current $I_O$ are separately set with their respective durations determined by the comparator 15.

In the power drive circuit 20, the target current $I_O$ is compared with the current i detected by the current detector 9. The power element drive circuit 20 supplies an on-off signal to the welding current supply section 7 according to the result of the comparison. In response to the signal from the power drive circuit 20, the welding current supply section 7 supplies the current i (indicated by the broken line in FIG. 2), the waveform of which is in conformance with that of the target current, so that the arc is maintained to weld the base metal 3.

Figure 3A:
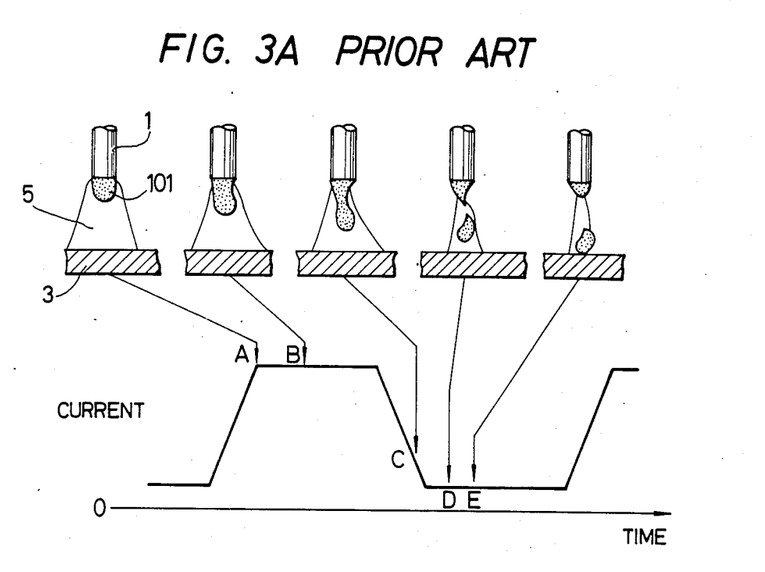
FIGS. 3A and 3B are explanatory diagrams for describing the movement of a molten droplet from the wire electrode to the base metal in the conventional pulse arc welding machine.
Figure 3B:
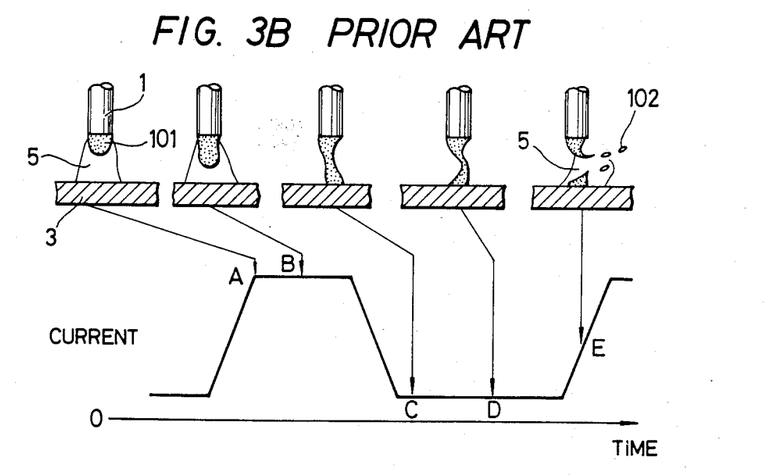

In the conventional pulse arc welding machine, designed as described above, a molten droplet is moved from the wire to the base metal as shown in FIGS. 3A and 3B. More specifically, FIG. 3A illustrates the case when the arc is relatively long while FIG. 3B illustrates when it is relatively short. Both figures indicate the relationships between the variation of the welding current waveform with time and the movement of a molten droplet from the wire to the base metal.

If the peak current value, the pulse width, and the pulse frequency are so set that one droplet is moved every pulse period, then in the case where the arc 5 is long as shown in FIG. 3A, a droplet 101 leaves the end of the wire 1 at the fall of the pulse (as indicted at C) or during the base current period (as indicated at D and E). However, it should be noted that, in the case where the arc 5 is long, the arc spreads widely across the base metal 3. Therefore welding defects such as, for instance, undercuts are liable to be formed especially when the welding speed is increased. Accordingly, in a high speed welding operation, it is essential to use a short arc.

However, in this case, as shown in FIG. 3B, the molten part of the wire 1 is elongated at the fall of the pulse current (as indicated at C) or during the base current period (As indicated at D), thus short-circuiting the wire 1 to the base metal 3. Furthermore, if the wire extension or the wire feeding speed is changed, the short-circuiting period is increased commensurately. Accordingly, at the subsequent rise of the pulse in the next period (as indicated at E), the droplet 101 is forcibly burnt off to once again form the arc 5, with the result that a large quantity of metal vapor is formed in the arc forming region. The pressure of the metal vapor blows away portions of the molten metal in the molten metal pool and the molten metal remaining on the wire, as shown in FIG. 3B. That is, the molten metal is spattered from the molten metal pool and the wire.

As is apparent from the above description, in the conventional pulse arc welding machine, no protection is provided against the difficulty which may occur when the period of short-circuiting the wire 1 and the base metal 3 is prolonged from one pulse to the rise of the next pulse. Especially when the arc is short, the molten metal is significantly spattered, thus clogging up machine components and the shielding gas nozzle. Thus, sometimes it is not suitable to use the conventional pulse arc welding machine for high speed welding operations.

SUMMARY OF THE INVENTION

An object of the invention is to eliminate the above-described difficulties accompanying a conventional pulse arc welding machine.

Another object of the invention is to provide high speed welding.

More specifically, an object of the invention is to provide a pulse arc welding machine in which, even when the wire and the base metal are short-circuited across the molten droplet when the arc is short, the welding operation is not affected by external disturbances and the molten metal is not significantly spattered In a pulse arc welding machine according to the invention, the voltage across the welding wire and the welding base metal is detected and compared with a reference value to determined whether the wire and the base metal is short-circuited or whether, instead, an arc is formed between the wire and the base metal. The rise of the pulse current is permitted only after it has been confirmed that an arc is reproduced between the wire and the base metal.

DETAILED DESCRIPTION OF THE PREFERRED EMBODIMENTS

One embodiment of this invention will be described with reference to the accompanying drawings.

Figure 4:
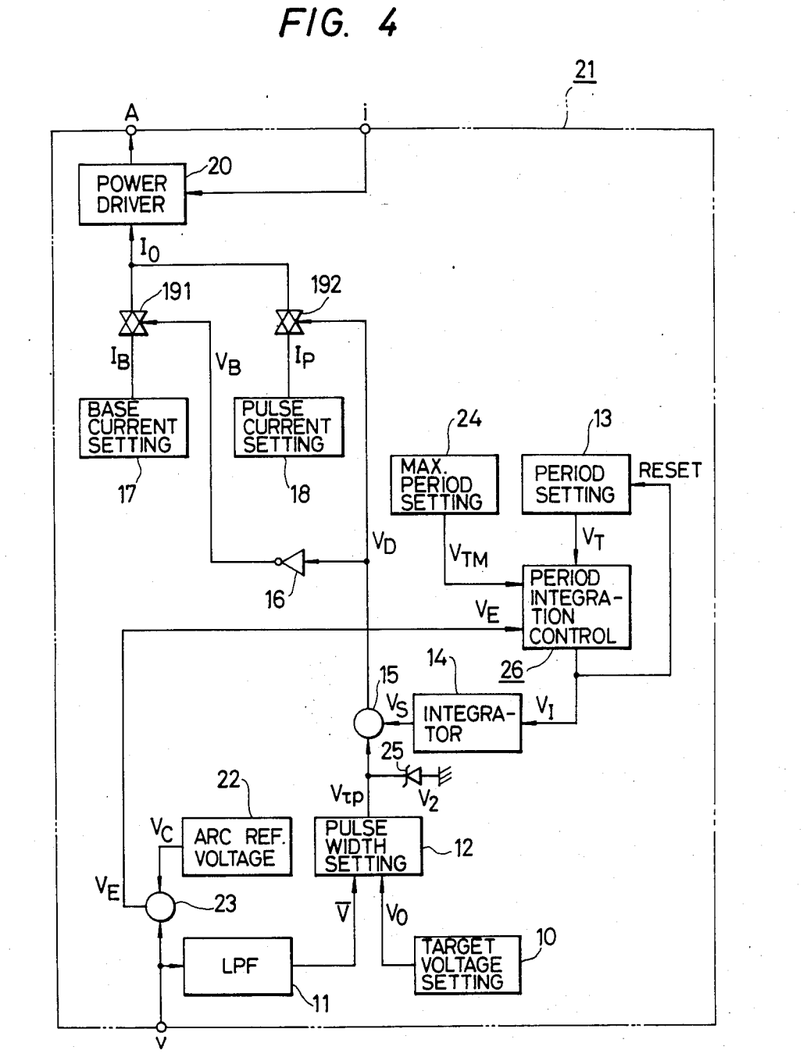
FIG. 4 is a block diagram showing one embodiment of a pulse arc welding machine of this invention.

In FIG. 4, elements similar to those of FIG. 1 are labelled by like numerals. Additionally, an arc maintaining voltage generator 22 generates a reference voltage $V_C$ which is used as a reference value for detecting whether a short-circuiting condition or an arc exists between a wire 1 and a base metal 3. A comparator 23 compares the output v of the voltage detector 8 with the output $V_C$ of the arc maintaining voltage generator 22. A maximum period setting circuit 24 outputs a voltage $V_{TM}$ corresponding to a maximum delay time $T_{max}$. A Zener diode determines a maximum voltage $V_2$ corresponding to a maximum pulse width $\tau_{pmax}$. A period integration control circuit 26 sets the rise time of a pulse current according to the output of the pulse period setting circuit 13 and the output of the comparator 23.

Figure 5:
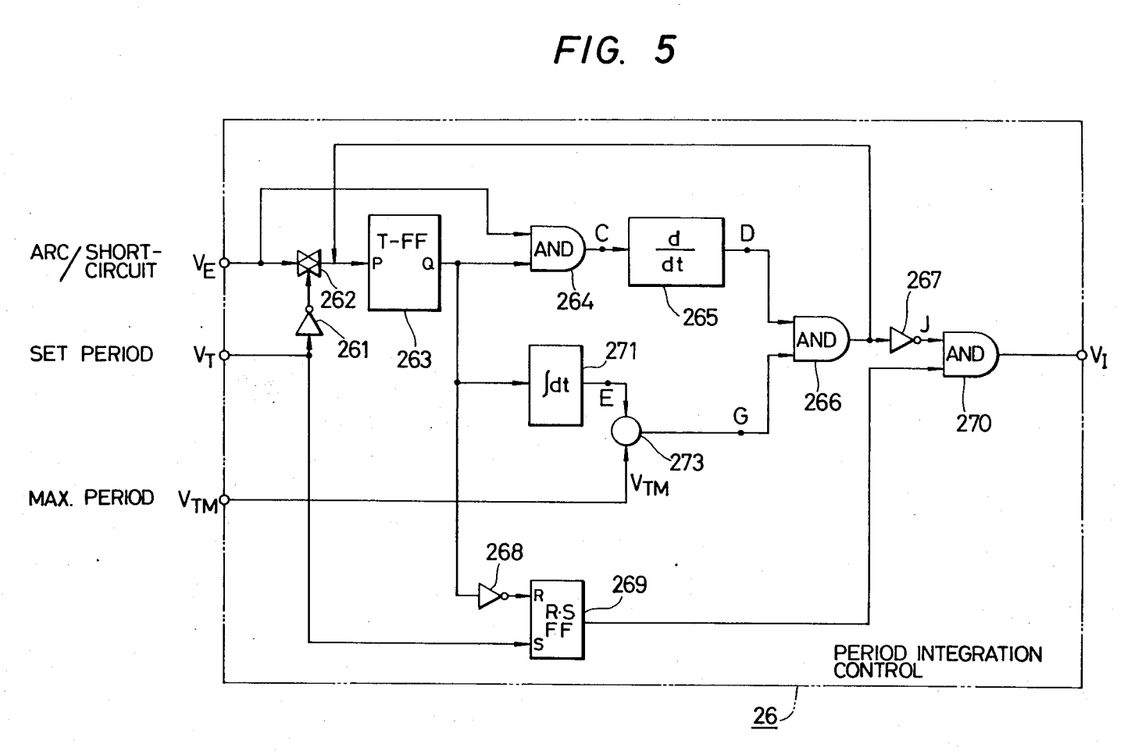
FIG. 5 is a block diagram showing a period integration control circuit in the welding machine of the invention.

FIG. 5 is a block diagram showing the period integration control circuit 26 in more detail. This circuit is composed of signal inverting elements 261, 267, 268, an analog switching element 262, a T-type flip-flop 263, AND logic circuits 264, 266 and 267, a differentiating circuit 265, an integrating circuit 271, an R-S flip-flop 269, and a comparator 273.

In the pulse arc welding machine thus organized, similarly to the operation in the conventional pulse arc welding machine, the pulse period is determined by the pulse period setting circuit 13 so that the molten droplet is moved to the base metal from the wire once per pulse period. On the other hand, the load voltage v is detected by the voltage detector 8. One of the outputs of the voltage detector 8 is compared with the reference value $V_C$ provided by the arc maintaining voltage generator 22 in the comparator 23, so as to detect whether the load voltage is due to short-circuiting or arcing. For instance the load voltage is higher than about 15 V with the short-circuiting of the wire 1 to the base metal 3, and it is lower than about 5 V with the arcing between the wire 1 and the base metal 3. Therefore, in the comparator 23, by detecting whether or not the load voltage is higher than, for instance, 10 V, it can be determined whether the load voltage is due to arcing or short-circuiting.

The above-described operation will be described in more detail with reference to timing charts of FIGS. 6 and 4.

Figure 6:
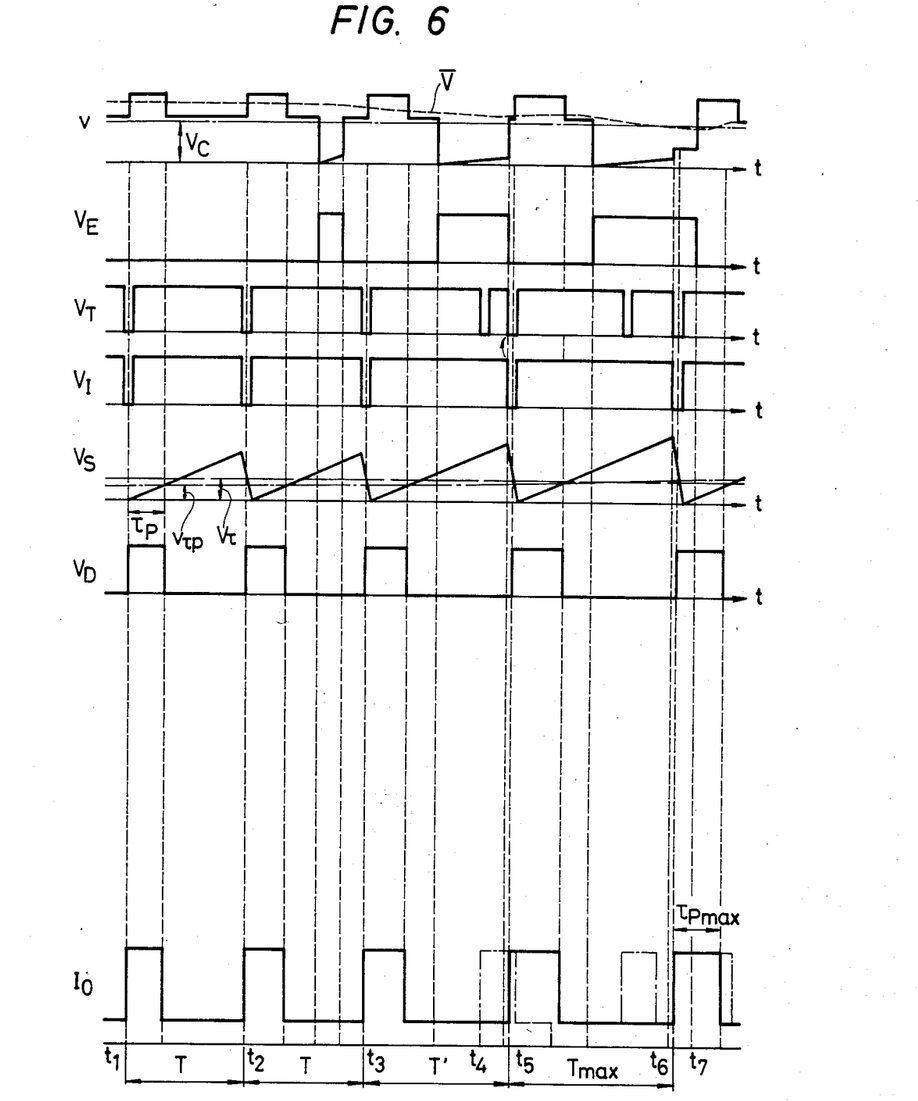
FIG. 6 is a waveform diagram for a description of the operation of the pulse arc welding machine of the invention.

FIG. 6 is a waveform diagram showing the operation of the pulse arc welding machine according to the invention. In FIG. 6, reference character v designates the welding voltage; $\overline{V}$, the voltage obtained by averaging the welding voltage v with the low-pass filter; $V_C$, the reference value; and $V_E$, an arcing and short-circuiting decision signal which indicates either arcing or short-circuiting decision signal which indicates either arcing or short-circuiting, the high level of $V_E$ indicating the occurrence of short-circuiting. Further in FIG. 6, reference character $V_T$ designates the pulse period instruction signal; $V_I$, a period integration instruction signal; $V_S$, the signal obtained by repeating the integrating and resetting operations according to the signal $V_I$; $V_2$, a voltage for setting the maximum pulse width $\tau_{pmax}$; $V_{\tau p}$, a voltage for setting a pulse width $\tau p$; $V_D$, the pulse width signal; and $I_O$, the target current (treated as a voltage).

Figure 7:
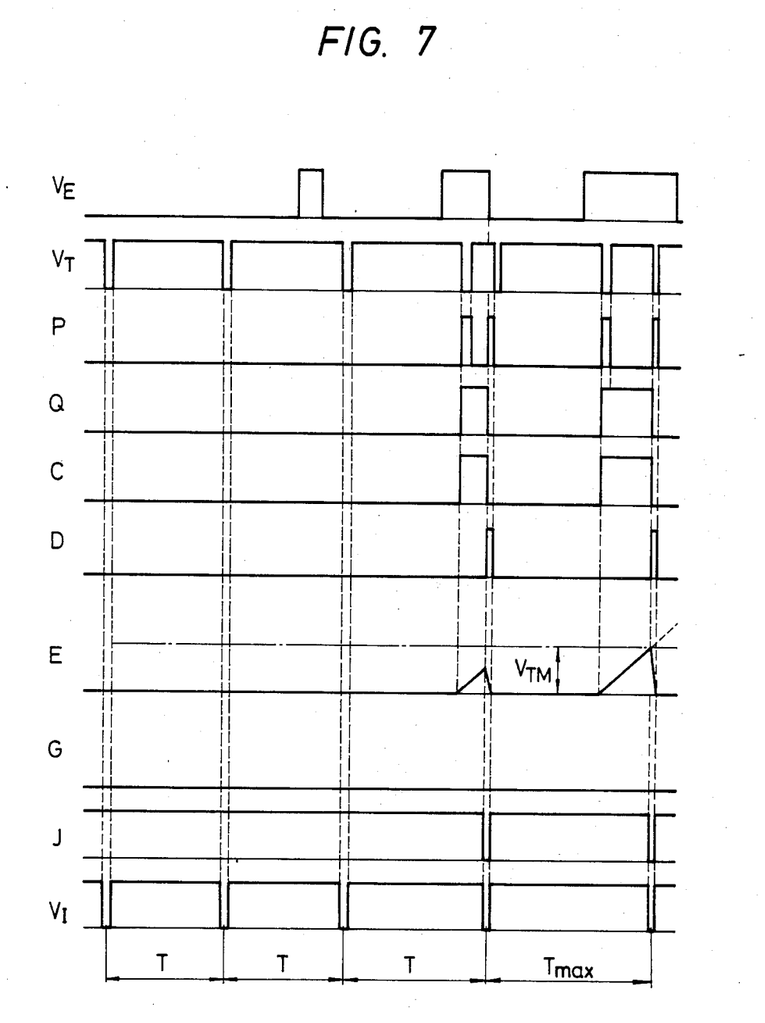
FIG. 7 is also a waveform diagram for a description of the operation of the period integration control circuit.

FIG. 7 is a waveform diagram for a description of the operation of the period integration control circuit 26 in the pulse arc welding machine of the invention. In FIG. 7, reference characters P, Q, C, D, E, G and J designate the waveforms of signals at the circuit points P, Q, C, D, E, G and J, respectively, shown in FIG. 6.

First, the output signal $V_T$ of the pulse period setting circuit 13 and the arcing and short-circuiting decision signal $V_E$ provided by the comparator 23 are applied to the period integration control circuit 26 as shown in FIG. 4. As a result, the period integration control circuit 26 outputs the period integration instruction signal $V_I$ which is applied to the reset terminal of the pulse period setting circuit 13 and to the integrating circuit 14. The period instruction signal $V_I$ is so designed that it provides a low level pulse every predetermined period T when the wire and the base material is not short-circuited and also when the short-circuiting is eliminated within the period T. It is also provides a low level pulse after reformation of the arc when the short-circuiting occurs within the maximum period $T_{max}$ set by the maximum period setting circuit 24. Lastly, it is forced to provide a low level pulse at the maximum period $T_{max}$ when the short-circuiting continues at the end of the maximum period $T_{max}$.

Furthermore, when the signal $V_I$ provides a low level pulse to the reset terminal of the pulse period setting circuit 13, the pulse period setting circuit 13 is reset, and a low level pulse is output as the pulse period signal $V_T$ every predetermined period T from the time instant of the resetting operation. In the period integration control circuit 26, as indicated in FIGS. 5 and 7, the pulse period signal $V_T$ is applied through the signal inverting element 261 to the gate of the analog switching element 262. Therefore, while the pulse period signal $V_T$ is providing a low level pulse, the analog switching element 262 is maintained conductive (on) so that the short-circuit indicating signal $V_E$ is applied to the T flip-flop 263. If the short-circuit signal $V_T$ is the low level while the pulse period signal $V_T$ is providing a low level pulse, the output Q of the T flip-flop 263 is at the low level. The output Q is applied through the signal inverting element 268 to the reset terminal of the R-S flip-flop 269. Therefore, the reset terminal of the R-S flip-flop 269 is held at the high level. Accordingly, the output of the R-S flip-flop has the same level as the signal $V_T$.

As shown in FIG. 4, if no short-circuit occurs during the pulse period T or if the short-circuit is removed within the pulse period T, the period instruction signal $V_I$ from the period integration control circuit 26 provides, through the flip-flop circuits 269 and 270, a low level signal with the same period as the output signal $V_T$.

On the other hand, if, when the pulse period signal $V_T$ is providing a low level pulse, the short-circuit signal $V_E$ is at the high level, then the output Q of the T flip-flop 263 is maintained at the high level until the pulse of the short-circuit signal $V_E$ is applied to the terminal P. If the output signal Q is at the high level, the output of the R-S flip-flop 269 is maintained at the high level. If the short-circuit occurs with a period longer than the pulse period T, the output of the R-S flip-flop 269 is at the high level and thus the output $V_I$ of the period control circuit 26 provides a low level signal. The output signal Q is applied to the integrating circuit 271, the output E of which is compared with the maximum period signal $V_{TM}$ in the comparator 273. When the output E is higher than the maximum period signal $V_{TM}$, the comparator 273 forcibly supplies the pulse to the circuit point G. On the other hand, the signal Q and the short-circuit signal $V_E$ are ANDed by the AND circuit 264, and the output signal C of the AND circuit 264 is held at the high level until the short-circuit signal $V_E$ is set to the low level. The signal C is applied to the differentiating circuit 265, and therefore the differentiating circuit 265 provides an output pulse at the fall of the signal C. The signal D and the signal G are applied to the AND circuit 266. Therefore, when the short-circuit signal $V_E$ falls within the maximum period $T_{max}$, the AND circuit 266 provides the pulse at the output terminal at the fall of the short-circuit signal $V_E$. In the opposite situation, the AND circuit 266 provides the pulse with the maximum period $T_{max}$. The pulse thus provided is fed back to the T flip-flop 263, to reset this flip-flop 263. The pulse is further applied to the signal inverting element 267, as a result of which the signal inverting element 267 provides the output signal J. The signal J and the output signal of the R-S flip-flop 269 are ANDed by the AND circuit 270, and the output of the AND the circuit 270 is the period instruction signal $V_I$.

The period instruction signal $V_I$ is applied to the period instruction integrating circuit 14 as shown in FIG. 1, where it is integrated into the integrated signal $V_S$ while the period instruction signal $V_I$ is being held at the high level as shown in FIG. 3. The integrated signal $V_S$ thus obtained is reset to zero when the period instruction signal $V_I$ is set to the low level. The output signal $V_S$ of the integrating circuit 14 is applied to the comparator 15.

On the other hand, the voltage $\overline{V}$, obtained by averaging the welding voltage v with the low-pass filter 11, and the target voltage $V_O$ are both supplied to the pulse width setting circuit 12, so that the pulse width setting circuit 12 applies the pulse width signal $V_{\tau p}$ to the comparator 15. The signal $V_{\tau p}$ is controlled by the Zener diode 25 so as not to be higher than the Zener voltage $V_2$.

That is, the output signal $V_S$ of the integrating circuit 14 is compared with the pulse width signal $V_{\tau p}$ in the comparator 15. As a result, the pulse period and base period decision signal $V_D$ is applied both to the analog switching element 292 and, through the signal inverting element 16, to the analog switching element 291.

When the decision signal $V_D$ is at the high level, the analog switching element 192 is turned on while the analog switching element 191 is turned off. Therefore, the pulse current Ip from the pulse current setting section 18 is applied, as the target current $I_O$, to the power element drive circuit 20. On the other hand, when the decision signal $V_D$ is at the low level, the analog switching element 191 is turned on while the analog switching element 192 is turned off. Therefore, the base current $I_B$ from the base current setting section 17 is applied, as the target current $I_O$, to the power drive circuit 20.

FIG. 6 shows the waveforms of the aforementioned signals. For the period of time between the time instants $t_1$ and $t_2$, no short-circuiting occurs between the wire 1 and the base metal 3, and therefore the molten metal is not sputtered. During the following period of time between the time instants $t_2$ and $t_3$, the wire 1 and the base metal 3 are shown as being short-circuited. However, during the base period, the molten droplet comes off the wire when the short-circuiting is followed by the arcing. Therefore, when the arc is formed again, the metal vapor pressure is low because of small current, and the molten metal is scarcely sputted. Accordingly, the pulse may rise at the time instants $t_2$ and $t_3$ following the period T similarly as in the conventional pulse arc welding machine. However, for the period of time between the time instants $t_3$ and $t_5$, the short-circuiting time is longer; that is, it lasts over the time instant $t_4$ (the end of the predetermined period T). In this case, the output $V_I$ of the period integration instruction circuit 26 is caused to provide a low level pulse, at the time of arc reformation, instead of at the time instant $t_4$, so that the pulse current rises immediately after the arc reformation ($t_5$). Thus, at the time of arc reformation, the current can be positively held lower than the base current.

In the above-described embodiment, the movement of the molten droplet is produced by the electromagnetic pinching force of the pulse current, and after the fall of the pulse current the molten droplet is dropped from the end of the wire by the inertia of the pinching force. In this case, the period is temporarily changed from T to T', as was described above. On the other hand, in the case where, for instance, the wire feeding speed is greatly changed so as to cause the wire feeding speed is greatly changed so as to cause the wire to strike against the base metal, the end portion of the wire must be forcibly fused off by the pulse current, but in this case only. For this purpose, the maximum time $T_{max}$ is allowed for the period, as shown in FIG. 6. This limitation is required to give a maximum tolerance to the waiting time for arc reformation. That is, the maximum period signal $V_{TM}$ specifying the maximum period $T_{max}$ should be applied to the period integration instruction circuit 26 by the maximum period setting circuit 23 which is adapted to set a maximum delay value allowable for the rise of the signal.

In the above-described embodiment, similarly as in the conventional pulse arc welding machine, the signal $\overline{V}$ obtained by averaging the output of the voltage detector 8 by the low-pass filter 11, is compared with the output of the target voltage setting unit 10 at all times so that the average load voltage is maintained substantially constant to thereby maintain the arc length. Also the pulse width variation is maintained to an extremely small variation. However, in the case where the short-circuiting time width is increased as described above, the average voltage $\overline{V}$ is commensurately decreased and therefore the upward pulse transition at the time instant $t_6$ occurs later than in the ordinary case. In this case, the quantity of wire molten per pulse period is increased, and the molten droplet is liable to short-circuit with the base metal. Since the pulse width is large, the short-circuiting occurs at the pulse peak, thus greatly spattered the molten metal. This difficulty may be overcome by including means for limiting the maximum pulse width. This is accomplished by connecting the Zener diode 25, having a Zener voltage $V_2$, to the output terminal of the pulse width setting circuit 12. The pulse width's maximum value $\tau p_{max}$ should be set to the maximum pulse width which meets the requirement for moving one molten droplet every pulse period, that is, about 2 ms for instance in the case where the mixing ratio of the shielding gas $Ar/CO_2$ is 8/2, the wire diameter is 1.2 mm, the wire extension is 15 mm, and the pulse peak value is 500 A.

Figure 8:
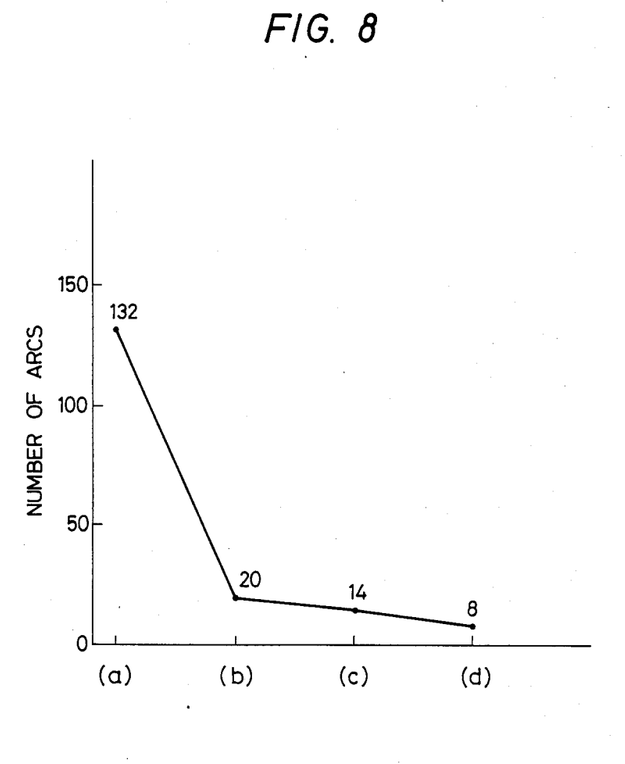
FIG. 8 is a graphical representation indicating the number of arcs which are measured during a peak current period in the pulse arc welding machine of the invention and in a conventional pulse arc welding machine.

FIG. 8 shows the number of arc reformations which are measured during the peak current period for fixed welding time of ten seconds in the case where the mixing ratio of the shield gas $Ar/CO_2$ is 9/1, the wire diameter is 1.2 mm, the wire extension is about 15 mm, and the pulse peak value is 500 A. In FIG. 8, the data at the point (a) on the horizontal axis is for the conventional pulse arc welding machine, the data at the point (b) is for the case of waiting for the arc reformation, the data at the point (c) is for the case of waiting for the arc reformation for 6 ms at maximum, and the data at the point (d) for the case of waiting for the arc reformation for 6 ms at maximum, with the pulse width's maximum value set to 2 ms. As is apparent from FIG. 8, waiting for the arc reformation and providing the maximum allowance to the pulse width suppresses not only the reformation of arc during the large current period but also the spattered of the molten metal.

As is apparent from the above description, in the pulse arc welding machine of the invention, the voltage across the wire and the base material is compared with the reference value to determine whether the wire and the base metal is short-circuited or whether an arc is formed between the wire and the base metal. The rise of the pulse current is permitted after formation of the arc. Therefore, the welding machine of the invention can suppress the spattered of the molten metal which is liable to occur at the formation of arc after the short-circuiting of the wire and the base metal.

In the pulse arc welding machine of the invention, the arc is reformed between the wire and the base metal before the pulse current rises. Therefore, the difficulty that a large quantity of molten is spattered is prevented, the movement of the molten droplet from the wire to the base metal is smoothely carried out, and the arc is stably maintained even in high speed welding operation.

What we claim is:

1. A pulse arc welding machine, comprising:
   means for applying a welding current, comprising current pulses with a predetermined period separated by periods of a base current of a level lower than that of said current pulses, to flow from a welding wire to a welding base metal, thereby performing welding;
   means for detecting a difference voltage between said welding wire and said base metal;
   means responsive to said difference voltage falling below a predetermined level, for inhibiting said applying means from applying a subsequent current pulse and maintaining said base current.

2. A pulse arc welding machine, comprising:
   means for applying a welding current, comprising current pulses with a predetermined period separated by periods of a base current of a level lower than that of said current pulses, to flow from a welding wire to a welding base metal, thereby forming an arc therebetween to perform welding;
   means for detecting a short-circuit between said welding wire and said base metal; and
   means for inhibiting said applying means from applying a subsequent current pulse when said welding wire and said base metal are short-circuited and maintaining said base current.

3. A welding machine as recited in claim 2, wherein said detecting means comprises means for detecting a difference voltage between said welding wire and said base metal.

4. A welding machine as recited in claim 2, further comprising means responsive to said short-circuit detecting means for reinitiating a phase of said predetermined period of said applying means upon a cessation of said welding wire and said base metal being short-circuited.

5. A welding machine as recited in claim 2, wherein said inhibiting means inhibits for no more than a predetermined maximum inhibition period.

6. A welding machine as recited in claim 5, wherein said applying means includes means for varying a pulse width of said current pulses up to a predetermined pulse width maximum.

7. A welding machine as recited in claim 2, wherein said applying means includes means for varying a pulse width of said current pulses up to a predetermined pulse width maximum.

* * * * *